US012383986B2

(12) United States Patent
Tanaka et al.

(10) Patent No.: US 12,383,986 B2
(45) Date of Patent: Aug. 12, 2025

(54) WELDING WORK MEASUREMENT SYSTEM (71) Applicant: Hitachi, Ltd., Tokyo (JP)

(72) Inventors: Akihide Tanaka, Tokyo (JP); Xudong Zhang, Tokyo (JP); Naoya Okizaki, Tokyo (JP); Isamu Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 922 days.

(21) Appl. No.: 17/596,163

(22) PCT Filed: Feb. 26, 2020

(86) PCT No.: PCT/JP2020/007704
§ 371 (c)(1),
(2) Date: Dec. 3, 2021

(87) PCT Pub. No.: WO2020/246080
PCT Pub. Date: Dec. 10, 2020

(65) Prior Publication Data
US 2022/0234146 A1 Jul. 28, 2022

(30) Foreign Application Priority Data

Jun. 6, 2019 (JP) ................................. 2019-106450

(51) Int. Cl.
B23K 31/12 (2006.01)
G06T 7/70 (2017.01)
(Continued)

(52) U.S. Cl.
CPC .............. B23K 31/125 (2013.01); G06T 7/70 (2017.01); G09B 19/24 (2013.01); H04N 7/183 (2013.01);
(Continued)

(58) Field of Classification Search
CPC ...... G09B 19/00; G09B 19/24; B23K 31/125; B23K 9/0956; B23K 9/0953; B23K 9/10;
(Continued)

(56) References Cited

U.S. PATENT DOCUMENTS 6,133,545 A 10/2000 Okazaki et al.
9,583,014 B2 * 2/2017 Becker ..................... B23K 9/16
(Continued)

FOREIGN PATENT DOCUMENTS

JP 57-27792 B2 6/1982
JP 4-266480 A 9/1992
(Continued)

OTHER PUBLICATIONS

International Search Report (PCT/ISA/210) issued in PCT Application No. PCT/JP2020/007704 dated Mar. 31, 2020 with English translation (seven (7) pages).
(Continued)

Primary Examiner — John P. Dulka
(74) Attorney, Agent, or Firm — Crowell & Moring LLP (57) ABSTRACT A welding work measurement system enables accurate measurement of a positional relation between respective parts. Therefore, a welding work measurement system includes a photodetection unit that detects light generated by a plurality of markers attached to a torch for welding a welding object or light reflected by the plurality of markers, a marker position acquisition unit that acquires marker position data that is three-dimensional coordinate data on the markers on the basis of the light detected by the photodetection unit, and a torch position acquisition unit that acquires torch position data that is three-dimensional coordinate data on the torch on the basis of the marker position data.

15 Claims, 7 Drawing Sheets (51) Int. Cl.
*G09B 19/24* (2006.01)
*H04N 7/18* (2006.01)
(52) U.S. Cl.
CPC .............. *G06T 2207/10016* (2013.01); *G06T 2207/30204* (2013.01)
(58) Field of Classification Search
CPC ............. G06T 7/70; G06T 2207/10016; G06T 2207/30204; G06T 2207/30152; G06T 7/73; H04N 7/183
See application file for complete search history.

(56) References Cited

U.S. PATENT DOCUMENTS

| | | | |
|---|---|---|---|
| 10,500,668 B2 | 12/2019 | Yoshida et al. | |
| 2016/0125762 A1* | 5/2016 | Becker | G09B 25/02 434/234 |
| 2017/0151634 A1 | 6/2017 | Witney | |

FOREIGN PATENT DOCUMENTS

| | | |
|---|---|---|
| JP | 3047890 B2 | 6/2000 |
| JP | 2001-71140 A | 3/2001 |
| JP | 2006-281270 A | 10/2006 |
| JP | 2008-110388 A | 5/2008 |
| JP | 4100545 B2 | 6/2008 |
| JP | 4129342 B2 | 8/2008 |
| JP | 2015-225214 A | 12/2015 |
| JP | 6126174 B2 | 5/2017 |
| JP | 2017-106908 A | 6/2017 |
| JP | 6309938 B2 | 4/2018 |

OTHER PUBLICATIONS

Japanese-language Written Opinion (PCT/ISA/237) issued in PCT Application No. PCT/JP2020/007704 dated Mar. 31, 2020 (three (3) pages).

* cited by examiner

| AVERAGE MOVING VELOCITY (cm/min) | 10-20 | 20-30 | 30 OR MORE |
|---|---|---|---|
| QUALITY | EXCESS WELD HEIGHT DEFECT | GOOD CONDITION | FUSION DEFECT |

| TORCH ANGULAR VELOCITY (degree/s) | 500 OR MORE FOR ONE SECOND OR MORE |
|---|---|
| QUALITY | BEAD APPEARANCE DEFECT |

WELDING WORK MEASUREMENT SYSTEM

TECHNICAL FIELD

The present invention relates to a welding work measurement system.

BACKGROUND ART

The environment of manufacturing has greatly changed with the recent social conditions. For example, it is becoming difficult to maintain manufacturing skills due to an increase in overseas production, an increase in products procured from overseas, a decrease in the number of skilled engineers, and the like, and quality control is facing a tougher situation. As a skill handing-down method so far, skills have been passed through direct coaching from skilled engineers. However, since means to hand skills down is insufficient and the coaching results in sensory coaching in many cases, it takes time in coaching or the skills are inaccurately handed down, so that there is a concern that the skills are not completely handed down and are lost. On the other hand, with the development of measurement technology in recent years, efforts have been made to measure and evaluate skilled techniques. As a method of solving the problems of handing the conventional skill down, efforts are being made to measure and evaluate the work of a subject by using various measurement devices. A method in which the measured data is compared with data measured in the past to evaluate the quality and is used in quality control and training of welding work has been proposed.

As an example, the abstract of Patent Document 1 below describes "a hand welding support device includes a welder operation measurement device 101 and a welding environment measurement device 102 that measure data relating to a welding environment including a welding object when a hand welding operation is performed and a behavior of a welder PS during the welding operation work, an arithmetic processing device 104 that extracts a feature amount of a welding state during the welding operation from the measurement data, a welding state determination device 105 that determines a quality of a hand welding state on the basis of the extracted feature amount therefrom, and a welding state presenting device 107 that presents information relating to transition of the welding state including the determination result here to the welder PS during the welding operation in a recognizable manner. In addition, the hand welding support device includes a welding process recording device 103 that records and holds the above-described measurement data, determination result, and feature amount, and a welding process display device 106 that displays at least the determination result."

PRIOR ART DOCUMENT

Patent Document

Patent Document 1: JP-2001-071140-A

SUMMARY OF INVENTION

Problem to be Solved by the Invention

In the meantime, although Patent Document 1 describes "measure data relating to a welding environment including a welding object and the behavior of a welder PS during the welding operation work," details such as the measurement principle are not particularly described.

The present invention has been made in view of the above-described circumstances, and an object thereof is to provide a welding work measurement system that can accurately measure the positional relation between respective parts.

Means for Solving the Problem

A welding work measurement system of the present invention for solving the above-described problem has a feature that the welding work measurement system includes a photodetection unit that detects light generated by a plurality of markers attached to a torch for welding a welding object or light reflected by the plurality of markers, a marker position acquisition unit that acquires marker position data that is three-dimensional coordinate data on the markers on the basis of the light detected by the photodetection unit, and a torch position acquisition unit that acquires torch position data that is three-dimensional coordinate data on the torch on the basis of the marker position data.

Advantageous of the Invention

According to the present invention, the positional relation between respective parts can be accurately measured.

MODES FOR CARRYING OUT THE INVENTION

First Embodiment

Configuration of First Embodiment

Figure 1:
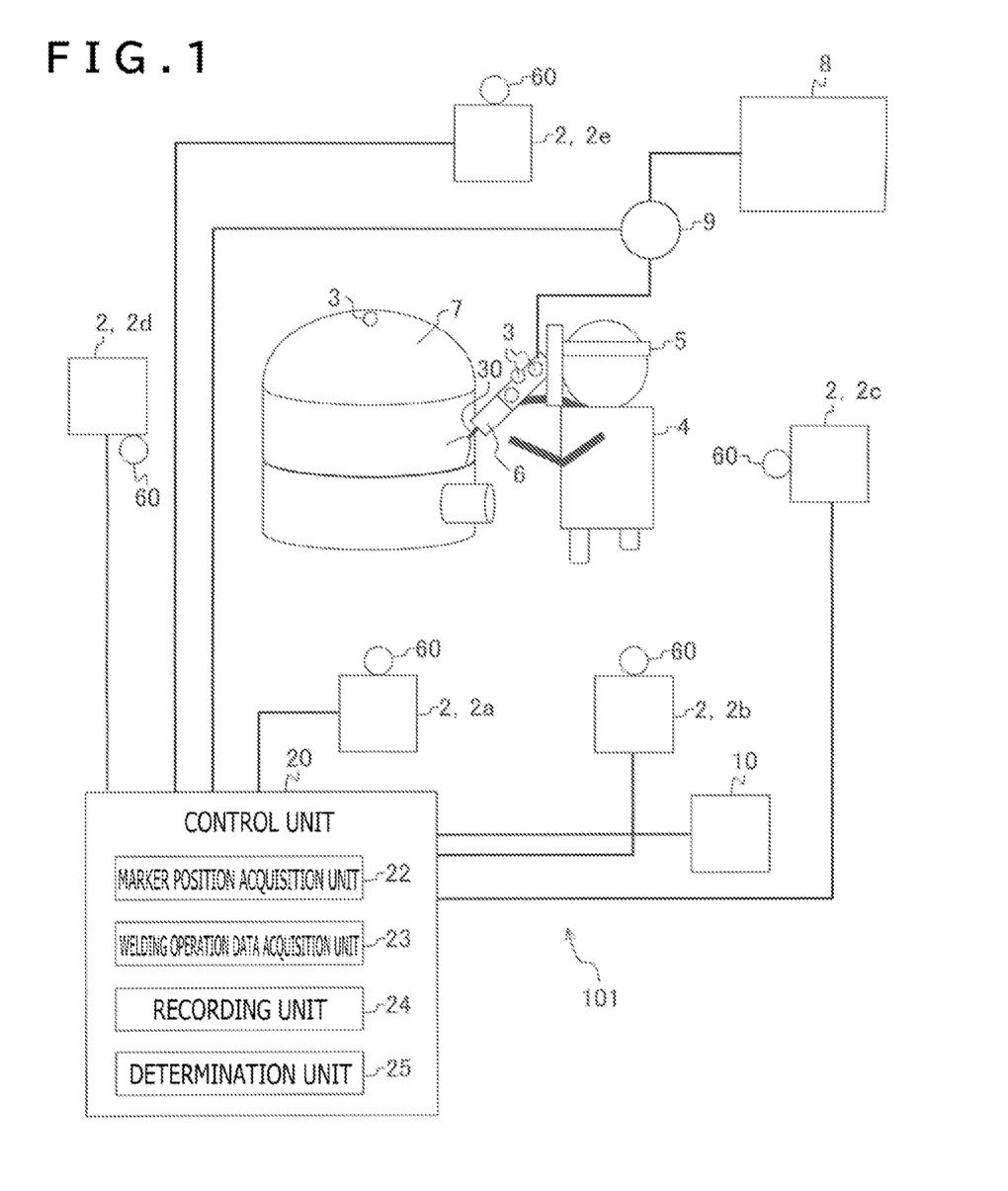
FIG. 1 is a schematic diagram of a welding work measurement system according to a first embodiment of the present invention.

FIG. 1 is a schematic diagram of a welding work measurement system 101 according to a first embodiment of the present invention. In FIG. 1, the welding work measurement system 101 includes a control unit 20, cameras for marker measurement 2a, 2b, 2c, 2d, and 2e (hereinafter, collectively referred to as "cameras for marker measurement 2" or "photodetection units"), a torch 6, a semi-automatic welding power supply 8, a current/voltage/filler metal supply amount measurement device 9, and a temperature/humidity/wind velocity measurement device 10.

A welder 4 (worker) who is a worker wears a light shielding surface 5 on the face, grips the torch 6, and performs welding work to a welding object 7. The torch 6 is a torch for consumable electrode type semi-automatic arc welding. In consumable electrode type semi-automatic arc welding, a filler metal 30 is a wire-like member wound around a drum (not depicted). The filler metal 30 is supplied up to the tip end of the torch 6 through the inside of the torch 6 by a feeding device (not depicted). In addition, the torch 6 is provided with a switch (not depicted), and the welder 4 performs on/off operations of the feeding device and the semi-automatic welding power supply 8 by operating the switch.

Since the filler metal 30 is melted and consumed by arc and is continuously fed by the feeding device, the arc sustains, and the welder 4 can continuously continue the arc welding as long as the filler metal 30 lasts. In addition, a plurality of markers 3 is attached to the torch 6 and the welding object 7. The welding work measurement system 101 measures the movement of the torch 6 when the welder 4 welds the welding object 7. The cameras for marker measurement 2 are arranged around the welder 4 and the welding object 7, and photograph a moving image of the torch 6 and surroundings thereof.

Each camera for marker measurement 2 includes a light irradiation unit 60 for irradiating a photographing target with light. It should be noted that the term "light" includes not only visible light (wavelength of 380 nm to 760 nm) but also electromagnetic waves such as ultraviolet rays and infrared rays in the present specification. The light irradiated by the light irradiation units 60 may contain components having a specific wavelength in a range of, for example, 350 nm to 11 μm. However, it is preferable that the irradiation light of the light irradiation units 60 avoids the wavelength of arc light (light generated at the time of arc welding). Since the spectrum of the arc light generated at the time of welding is generally distributed in a wavelength range of 550 nm or less, it is preferable to use a wavelength of 550 nm or more for the irradiation light of the light irradiation units 60.

In addition, in order to make the distinction between the arc light and the irradiation light clearer, a wavelength of 650 nm or more is preferably used for the irradiation light of the light irradiation units 60, and more preferably a wavelength of 750 nm or more is used. In addition, the upper limit of the wavelength of the irradiation light is preferably 2 μm or less from the viewpoint of the cost of the light source, and more preferably 1 μm or less. It should be noted that light having a wavelength of 850 nm is applied as the irradiation light of the light irradiation units 60 in the present embodiment. The cameras for marker measurement 2 supply a moving image to the control unit 20.

The current/voltage/filler metal supply amount measurement device 9 measures the current supplied to the filler metal 30, the voltage applied to the filler metal 30, and the supply amount of the filler metal 30. The temperature/humidity/wind velocity measurement device 10 measures data on a temperature, humidity, a wind velocity, and the like. The data on the current, voltage, temperature, humidity, wind velocity, and the like represents the state of the welding environment, and thus will be hereinafter referred to as "welding environment data."

The control unit 20 includes hardware as a general computer, such as a CPU (Central Processing Unit), a RAM (Random Access Memory), a ROM (Read Only Memory), an SSD (Solid State Drive), and a display device for displaying an arithmetic result of an arithmetic processing device, and the SSD stores an OS (Operating System), an application program, various data, and the like. The OS and the application program are deployed to the RAM and executed by the CPU.

In FIG. 1, functions realized by the application program and the like are depicted as blocks in the control unit 20. That is, the control unit 20 includes a marker position acquisition unit 22, a welding operation data acquisition unit 23 (torch position acquisition unit), a recording unit 24, and a determination unit 25.

The marker position acquisition unit 22 acquires marker position data that is three-dimensional coordinate data on each marker 3 on the basis of output signals of the cameras for marker measurement 2. In addition, the welding operation data acquisition unit 23 stores three-dimensional graphic data of the torch 6 in advance. Further, the welding operation data acquisition unit 23 acquires torch position data that is three-dimensional coordinate data on the torch 6 on the basis of the three-dimensional graphic data on the torch 6 and the marker position data on each marker 3.

Further, the welding operation data acquisition unit 23 calculates data on the velocity of the torch 6, the height of the torch 6, a weaving cycle, a weaving width, a torch angle, and the like on the basis of the torch position data. Here, the weaving indicates swinging of the torch 6 in a direction intersecting with the welding advancing direction. The data acquired by the welding operation data acquisition unit 23 is referred to as welding operation data. In addition, the result of evaluating the welding quality for the welding state of the welding object 7 after completion of the welding is referred to as welding evaluation data. More specifically, the welding evaluation data includes the presence or absence of internal defects in the welding object 7, the presence or absence of beat meandering, the amount of welding deformation, the presence or absence of residual stress, and the like.

The recording unit 24 stores the welding operation data, the welding evaluation data, and the welding environment data in association with a welding position or a welding time. The data recorded in the recording unit 24 is collectively referred to as "work data." On the basis of the work data by a skilled worker stored in the past and newly acquired work data, the determination unit 25 determines the skill or the like of the welder 4 relating to the newly acquired work data.

Figure 2:
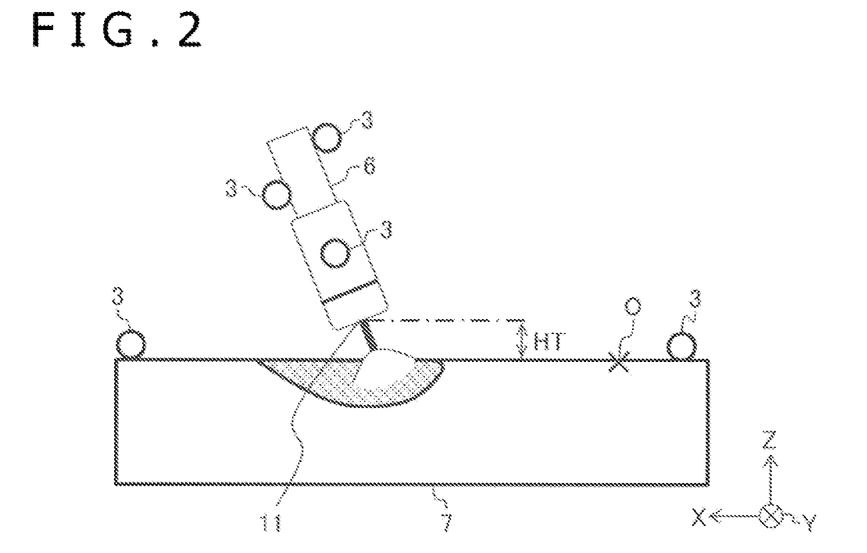
FIG. 2 is a schematic diagram of surroundings of a torch.

FIG. 2 is a schematic diagram of the surroundings of the torch 6. The plurality of markers 3 attached to the torch 6 is attached to positions where a specific spot 11 of the torch can be estimated on the basis of the positional relation thereof. In the illustrated example, the specific spot 11 is the "tip-end center" of the torch 6, but the position of the torch 6 other than the "tip-end center" or the tip-end position of the filler metal 30 may be the specific spot 11. In addition, the distance between the tip-end center position of the torch 6 and the welding object 7 is referred to as a torch height HT. In addition, the markers 3 are also attached to the welding object 7 in the illustrated example.

In addition, the markers 3 may be additionally attached to spots other than the torch 6, such as the hand of the welder 4 and the light shielding surface 5 (see FIG. 1). Thus, information such as the position and posture of the body of the welder 4 and the position of the head of the welder 4 can also be acquired. As described above, the markers 3 are preferably provided particularly at spots having a predetermined positional relation with respect to the position of the torch 6. However, it is sufficient that the markers 3 are attached to at least the torch 6, and it is not essential to provide the markers 3 at spots other than the torch 6.

When the irradiation light of the cameras for marker measurement 2 (see FIG. 1) is reflected on the marker 3, the position of the marker 3 is measured as described above, and the control unit 20 (see FIG. 1) accordingly estimates the position of the specific spot 11. Further, the control unit 20 calculates the velocity of the torch 6, the height of the torch 6, the weaving cycle, the weaving width, the torch angle, and the like as described above according to the movement of the specific spot 11.

Here, if the specific spot 11 is estimated only by one marker 3, it becomes difficult to predict the position of a high temperature portion where the arc is being generated. In addition, spattering generated by the arc welding may be erroneously recognized as the marker 3, and the accuracy is lowered. In addition, if the specific spot 11 is estimated only by two markers 3, the control unit 20 may erroneously recognize the position of the specific spot 11 as the position rotated from the actual position when the sputtering occurs, and the accuracy may be lowered. Therefore, in order to accurately estimate the specific spot 11 of the torch 6, at least two markers 3 are preferably provided, and more preferably three or more markers 3 are provided.

Figure 3:
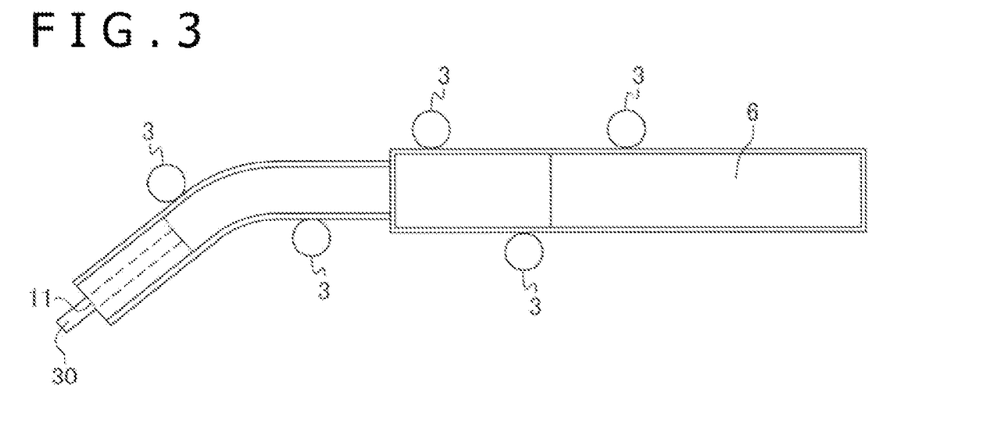
FIG. 3 is a schematic side view of the torch.

FIG. 3 is a schematic side view of the torch 6.

As depicted in the drawing, the plurality of markers 3 is arranged so as to be zigzag in a side view, in other words, vertically asymmetric and horizontally asymmetric. Accordingly, it is possible to estimate the specific spot 11 with higher accuracy than, for example, a case where the markers 3 are arranged so as to be vertically symmetric or horizontally symmetric. Further, the markers 3 are arranged so as not to overlap each other even when the markers 3 are photographed by any of the cameras for marker measurement 2 at the time of using the torch 6.

Further, it is preferable that the marker 3 has a material for retroreflecting light or a marker 3 coated with paint for retroreflecting light is applied. In addition, it is preferable that the marker 3 has a spherical portion. With these features, the position of the marker 3 can be recognized with high sensitivity, and the calculation accuracy of the specific spot 11 can be improved. In addition, in order to distinguish the marker 3 from the sputtering, it is preferable that the marker 3 is recognized by filtering processing on the basis of the size, sphericity, and the like. Accordingly, it is difficult to erroneously recognize the spattering as the marker 3, and the detection accuracy of the marker 3 is improved.

In FIG. 2, it is preferable that the welding object 7 is arranged at a predetermined position corresponding to a preset reference point (origin O). That is, the welding object 7 may be installed using a jig or the like such that the directions of respective portions of the welding object 7 are aligned with respect to preset coordinate axes X, Y, and Z. For example, as depicted in FIG. 2, it is conceivable to align the welding start position to the origin O by setting the X direction to the welding direction, setting the Y direction to the direction on the surface of the welding object 7 orthogonal to the welding direction, and setting the Z direction to the direction of the torch height HT. If the welding object 7 is positioned as described above, the position of the welding object 7 can be easily grasped without installing the marker 3 on the welding object 7. However, as described above, in order to improve the positional accuracy of the welding object 7, the marker 3 may be installed on the welding object 7.

Operation of First Embodiment

Figure 4:
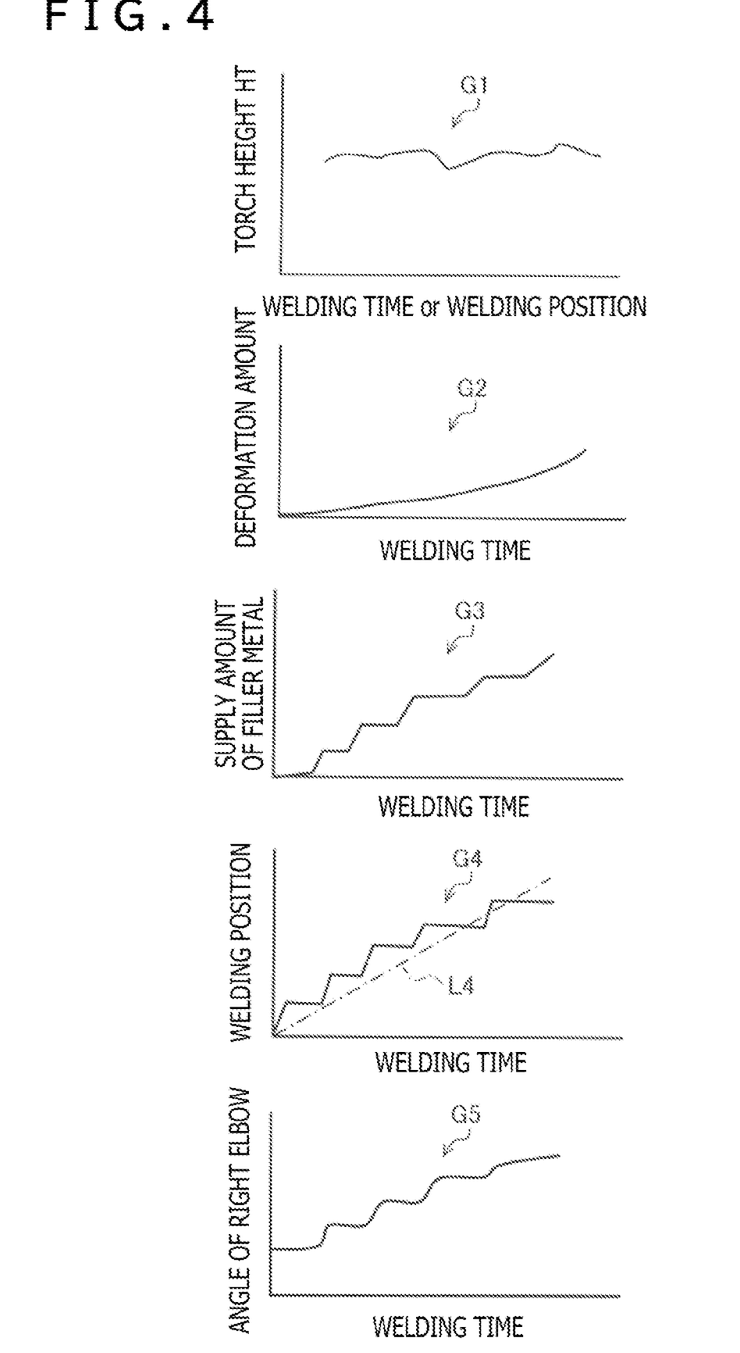
FIG. 4 is a diagram for depicting examples of measurement results of various welding operation data.

FIG. 4 is a diagram for depicting examples of measurement results of various welding operation data.

A graph G1 in FIG. 4 is a graph in which the vertical axis represents the torch height HT (see FIG. 2) and the horizontal axis represents the welding time or welding position. In addition, a graph G2 is a graph in which the vertical axis represents the deformation amount of the welding object 7 and the horizontal axis represents the welding time. In addition, a graph G3 is a graph in which the vertical axis represents the supply amount of the filler metal and the horizontal axis represents the welding time.

In addition, a graph G4 is a graph in which the vertical axis represents the welding position and the horizontal axis represents the welding time. Here, the welding position is a position in the welding advancing direction (X direction in FIG. 2) of the torch 6 using the welding start position (not depicted) as a reference. An approximate straight line L4 depicted in the graph G4 is a line obtained by approximating the graph G4 with a straight line. In addition, a graph G5 is a graph in which the vertical axis represents the angle of the right elbow of the welder 4 (see FIG. 1) and the horizontal axis represents the welding time. However, it is assumed that the welder 4 grips the torch 6 with the right hand.

The control unit 20 (see FIG. 1) can calculate the various measurement results depicted in FIG. 4 and the positions, velocities, angles, trajectories, accelerations, angular velocities, and the like of the respective parts on the basis of the three-dimensional coordinate data on the welding object 7 and the three-dimensional coordinate data on the markers 3 of the torch 6, the welder 4, and the like. In other words, the welding operation of the welder 4 who is a skilled worker or the welding operation of the welder 4 who is a beginner can be acquired as data, and the welding operation can be quantitatively evaluated. In particular, according to the calculated supply amount of the filler metal depicted in the graph G3 and the welding position depicted in the graph G4, it has been confirmed that a periodic operation pattern repeating stationary and moving appears in the filler metal 30 and the torch 6.

Further, according to the graph G5, it has been confirmed that the angle of the right elbow of the welder 4 also increases in conjunction with the movement of the torch 6. In addition, as a result of calculating the deformation amount of the welding object 7 as depicted in the graph G2 on the basis of the coordinate data on the markers 3 attached to the welding object 7, it has been confirmed that the deformation amount increases with the welding time. By quantitatively evaluating the deformation amount on the spot, the deformation amount can be added as an offset to the coordinate data on the torch 6 at the time of measurement of the next welding pass, and the relative position of the torch 6 to the welding object 7 can be measured with high accuracy. As described above, by attaching the markers 3 to the torch 6, the welding object 7, the filler metal 30, and the welder 4 and measuring the relative positional relation, it is possible to evaluate even the interlocking operation with high accuracy.

Effect of First Embodiment

As described above, according to the present embodiment, the system includes: the photodetection unit (2) that detects light generated by the plurality of markers 3 attached to the torch 6 for welding the welding object 7 or light reflected by the plurality of markers 3; the marker position acquisition unit 22 that acquires marker position data that is three-dimensional coordinate data on the markers 3 on the basis of the light detected by the photodetection unit (2); and the torch position acquisition unit (23) that acquires torch position data that is three-dimensional coordinate data on the torch 6 on the basis of the marker position data. Accordingly, the positional relation between the respective parts such as the torch 6 and the welding object 7 can be accurately measured.

In addition, according to a configuration in which the light irradiation unit 60 that irradiates the markers 3 with light having a specific wavelength is further provided, the photodetection unit (2) includes a filter for extracting the light having a specific wavelength, and the marker position acquisition unit 22 acquires the marker position data according toing to the light having a specific wavelength, accurate marker position data can be acquired by the light having a specific wavelength. Similarly, according to the configuration further including the light irradiation unit 60 that irradiates the markers 3 with the light having a specific wavelength, accurate marker position data can be acquired by the light having a specific wavelength. In particular, by allowing the light having a specific wavelength to include light having a wavelength of 550 nm or more, it is possible to suppress the influence of arc light, sputtering, or the like on position detection.

In addition, three or more markers 3 are attached to the torch 6, and the torch position acquisition unit (23) acquires the torch position data on the basis of three or more pieces of marker position data. Accordingly, more accurate torch position data can be acquired.

Further, the plurality of markers 3 has spherical portions, and the plurality of markers 3 is arranged so as not to overlap each other when viewed from the photodetection unit (2) when the torch 6 is used. Further, the photodetection unit (2) is a camera for photographing a moving image, and the marker position acquisition unit 22 distinguishes an image of the marker 3 from other images on the basis of the size of an image included in the moving image or sphericity. According to the present embodiment, more accurate torch position data can be acquired by these features.

In addition, in the present embodiment, any of the plurality of markers 3 is also attached to the filler metal applied to the welding work or to the worker (4) who grips the torch 6, and the torch position acquisition unit (23) acquires three-dimensional coordinate data on the filler metal or the worker (4) in addition to the three-dimensional coordinate data on the torch 6. Accordingly, the positions of the worker (4), the filler metal, and the like can also be acquired, and the welding state can be grasped more accurately.

In addition, in the present embodiment, the recording unit 24 that records the work data in which the three-dimensional coordinate data on the torch 6 and the welding evaluation data that is an evaluation result for the welding state of the welding object 7 after completion of the welding are associated with each other is further provided. In addition, the recording unit 24 stores the work data in association with a welding time or a welding position, and the determination unit (25) that determines the quality of new welding work on the basis of the work data stored in the recording unit 24 in the past and the three-dimensional coordinate data on the torch 6 acquired in the new welding work is further provided. Accordingly, it is possible to determine the quality of the new welding work on the basis of the work data stored in the recording unit 24 and the three-dimensional coordinate data on the torch 6 acquired in the new welding work.

In addition, in the present embodiment, the work data includes any of the average moving velocity of the torch 6, the torch height (HT) of the torch 6, the weaving cycle of the torch 6, the weaving width of the torch 6, the angle of the torch 6, the supply amount of the filler metal, the angle of the elbow on the side where the worker (4) gripping the torch 6 grips the torch 6, or the position of the head of the worker (4). Accordingly, more accurate work data can be recorded. In other words, the welding work operation can be accurately digitalized, and by utilizing the digitalized data in an education system and quality control, it is possible to realize a welding work measurement system that can efficiently hand the skills down, improve the manufacturing quality, and contribute to a reduction in the defect rate.

Second Embodiment

Figure 5:
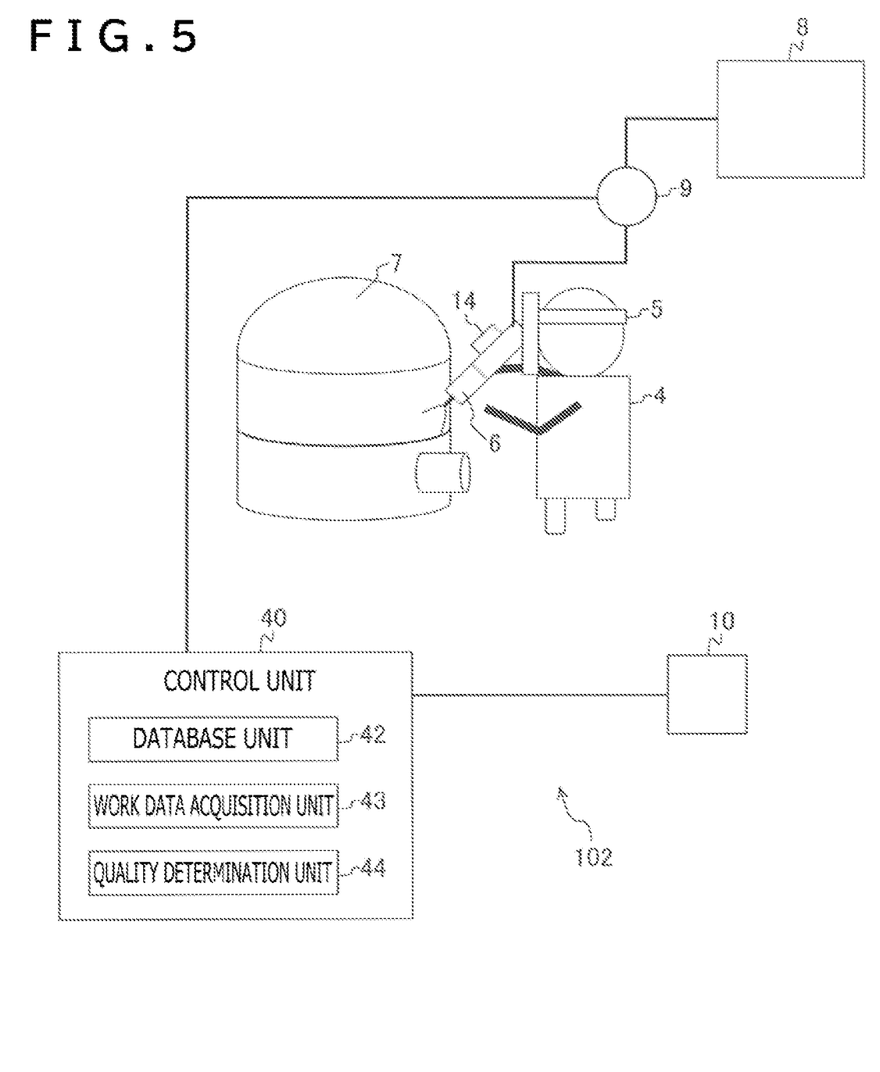
FIG. 5 is a schematic diagram of a quality control system according to a second embodiment of the present invention.

FIG. 5 is a schematic diagram of a quality control system 102 according to a second embodiment of the present invention. It should be noted that the parts corresponding to the respective parts of the above-described first embodiment will be followed by the same reference signs in the following description, and the description thereof will be omitted in some cases. In FIG. 5, the quality control system 102 includes a control unit 40, a torch 6, a semi-automatic welding power supply 8, a current/voltage/filler metal supply amount measurement device 9, a temperature/humidity/wind velocity measurement device 10, and an inertial sensor 14 (sensor).

The inertial sensor 14 is a device that measures a three-axis acceleration and a three-axis angular velocity generated in the torch 6. When comparing with the cameras for marker measurement 2, the markers 3, and the like provided in the welding work measurement system 101 of the first embodiment, the inertial sensor 14 is inexpensive and easy to be handled. In addition, as similar to the control unit 20 (see FIG. 1) of the first embodiment, the control unit 40 includes a CPU, a RAM, a ROM, an SSD, and a display device, and the SSD stores an OS, an application program, various data, and the like. In FIG. 5, functions realized by the application program and the like are depicted as blocks in the control unit 40. That is, the control unit 40 includes a database unit 42, a work data acquisition unit 43, and a quality determination unit 44.

The database unit 42 stores past work data that is work data on a skilled worker acquired in the past. The past work data stored in the database unit 42 may be acquired by the welding work measurement system 101 according to the above-described first embodiment, or may be acquired by the quality control system 102 according to the present embodiment. As described above, the work data (and the past work data) are data including the welding operation data (the graphs G1 to G5 and the like in FIG. 4), the welding evaluation data (the presence or absence of internal defects and the like), and the welding environment data (the current, voltage, temperature, and the like).

The quality determination unit 44 determines welding quality by comparing newly measured work data with the past work data by a skilled worker. The quality determination unit 44 can also evaluate the work skill level of the welder 4.

More specifically, as described above, the database unit 42 stores the past work data, that is, contents such as the graphs G1 to G5 (see FIG. 4) acquired in the past welding work. The work data acquisition unit 43 acquires present work data on the basis of an output signal of the inertial sensor 14. The quality determination unit 44 compares the past work data with the present work data, and controls the quality of the welding work on the basis of the result.

As a result of a correlation analysis between the welding operation data acquired by the welding work measurement system 101 of the first embodiment and the welding evaluation data, that is, the welding quality, the average moving velocity of the torch 6 and the torch angular velocity are extracted as feature amounts having a strong correlation with the quality. Here, the average moving velocity of the torch 6 is obtained by the inclination of the approximate straight line L4 in the graph G4 of FIG. 4. In addition, the torch angular velocity indicates the angular velocity of the torch 6 generated by weaving.

Figure 6:
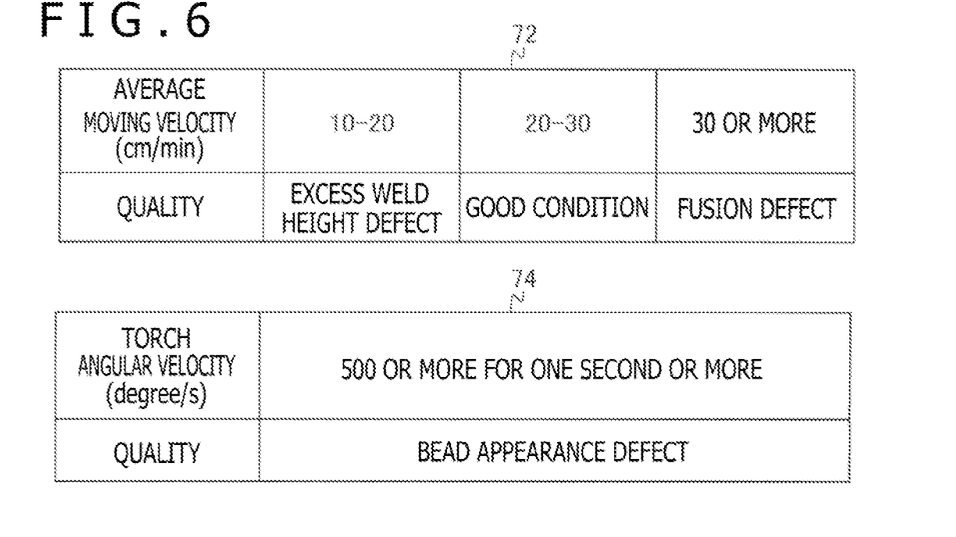
FIG. 6 is a diagram for depicting the relation between an average moving velocity/torch angular velocity and welding quality.

FIG. 6 is a diagram for depicting the relation between the average moving velocity/torch angular velocity and the welding quality.

In FIG. 6, a table 72 indicates the relation between the average moving velocity of the torch 6 and the welding quality. In addition, a table 74 indicates the relation between the torch angular velocity and the welding quality. As depicted in the table 72, the average moving velocity of the torch 6 is preferably approximately 20 to 30 cm/min. In addition, if a torch angular velocity of 500 degree/s or more is continued for one second or more, a bead appearance defect occurs.

Figure 7:
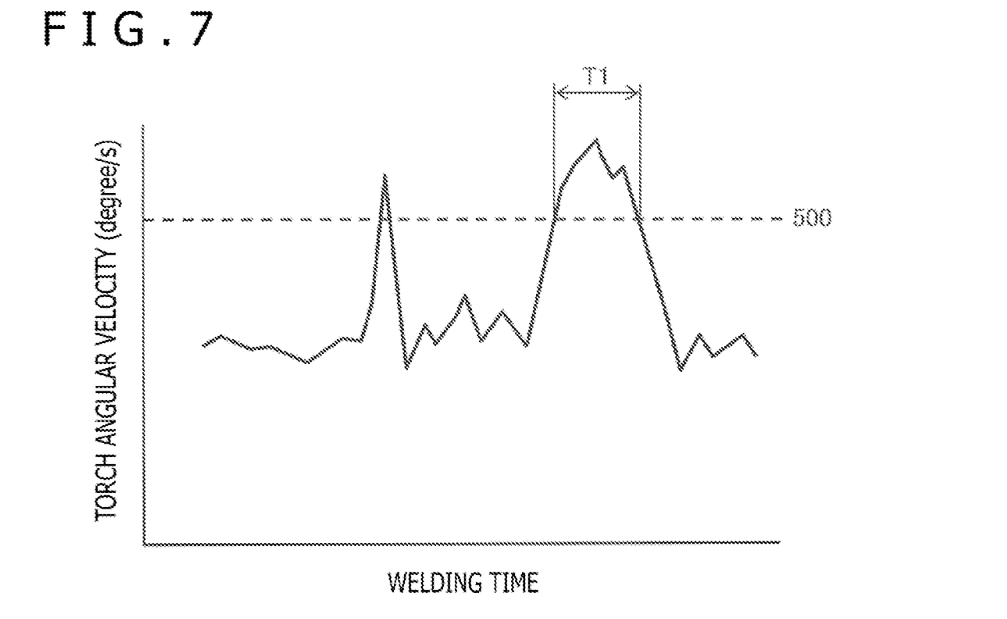
FIG. 7 depicts an example of a measurement result of the torch angular velocity.

FIG. 7 depicts an example of the measurement result of the torch angular velocity. It should be noted that in the measurement depicted in the drawing, the average moving velocity of the torch 6 is 26.7 cm/min, which is in a good range according to the table 72 (see FIG. 6). On the other hand, in a period T1 of FIG. 7, the torch angular velocity is 500 degree/s or more. In addition, the length of the period T1 is 1.7 seconds. As a result of visually observing the appearance at a portion corresponding to the period T1 in the welding object 7, it is determined that the bead appearance of the portion is disturbed and the appearance is defective.

As in the example of FIG. 7, according to the quality control system 102 of the embodiment, it is possible to estimate the type of defect and the position of occurrence immediately after the welding. That is, the welding work measurement system 101 (see FIG. 1) of the first embodiment extracts the feature amount having a strong correlation with the welding quality, and the welding quality can be controlled using a simpler sensor such as the inertial sensor 14.

Third Embodiment

Configuration of Third Embodiment

Figure 8:
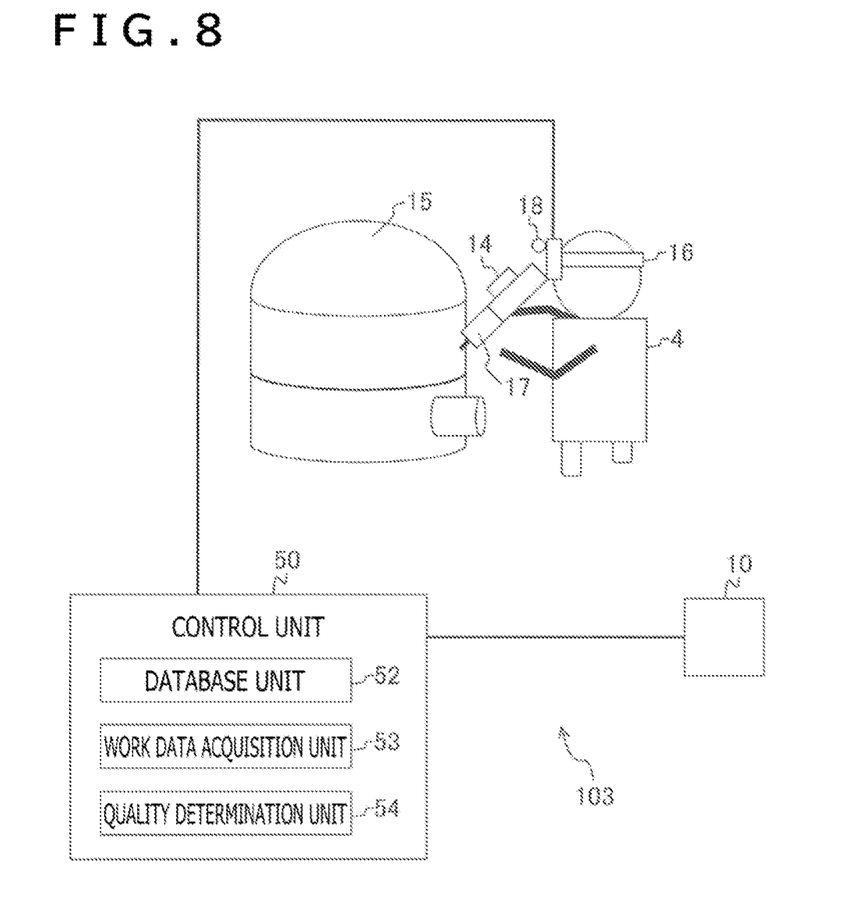
FIG. 8 is a schematic diagram of a welding work education system according to a third embodiment of the present invention.

FIG. 8 is a schematic diagram of a welding work education system 103 (welding work measurement system) according to a third embodiment of the present invention. It should be noted that the parts corresponding to the respective parts of the other embodiments will be followed by the same reference signs in the following description, and the description thereof will be omitted in some cases. In FIG. 8, the welding work education system 103 includes a temperature/humidity/wind velocity measurement device 10, an inertial sensor 14, a welding object simulated component 15, a head-mounted display 16 (display unit), a simulated torch 17, a camera 18 (imaging unit), and a control unit 50.

The welding object simulated component 15 and the simulated torch 17 have the same shapes and weights as the welding object 7 and the torch 6 in the first and second embodiments described above, and simulate the welding object 7 and the torch 6, respectively. The head-mounted display 16 is attached to the welder 4 so as to cover both eyes and displays various images to the welder 4. The camera 18 is mounted on the head-mounted display 16 and photographs the front of the welder 4.

As similar to the control unit 20 (see FIG. 1) of the first embodiment, the control unit 50 includes a CPU, a RAM, a ROM, an SSD, and a display device, and the SSD stores an OS, an application program, various data, and the like. In FIG. 8, functions realized by the application program and the like are depicted as blocks in the control unit 50. That is, the control unit 50 includes a database unit 52, a work data acquisition unit 53, and a quality determination unit 54.

Since the simulated torch 17 does not generate sputtering, arc light, or the like, the work data can be easily collected by the ordinary camera 18 or the like. The database unit 52 of the control unit 50 stores past work data as similar to the database unit 42 of the second embodiment. The work data acquisition unit 53 acquires present work data on the basis of an output signal of the inertial sensor 14 and a moving image photographed by the camera 18. The quality determination unit 54 compares the past work data with the present work data, and controls the quality of simulated welding work on the basis of the result.

As described above in the second embodiment, the average moving velocity of the torch 6 (see FIG. 5) and the torch angular velocity are feature amounts having a strong correlation with the quality. Therefore, the average moving velocity of the simulated torch 17 and the torch angular velocity are feature amounts having a strong correlation with the quality in the present embodiment. Therefore, in order to measure and calculate these feature amounts, the inertial sensor 14 applied to the second embodiment is mounted on the simulated torch 17 in the present embodiment.

The welding work education system 103 according to the present embodiment compares the past work data by a skilled worker with new work data acquired by the camera 18 on the basis of these feature amounts, and controls the quality on the basis of the result. That is, according to the present embodiment, it is possible to carry out education and training of the welder 4 without actually performing the welding work.

Patterns for image recognition are provided (not depicted) on the surfaces of the welding object simulated component 15 and the simulated torch 17. The camera 18 photographs the welding object simulated component 15, the simulated torch 17, and the like together with these patterns. The moving image photographed by the camera 18 and the measurement result of the inertial sensor 14 are supplied to the work data acquisition unit 53 of the control unit 50. The work data acquisition unit 53 calculates position data on the welding object simulated component 15 and the simulated torch 17 on the basis of the supplied moving image and the measurement result of the inertial sensor 14. Next, on the basis of three-dimensional graphic data on the welding object simulated component 15 and the simulated torch 17, the work data acquisition unit 53 calculates three-dimensional coordinate data thereof. In addition, the control unit 50 can display an image of the simulated welding work including the welding object simulated component 15 and the simulated torch 17 on the screen of the head-mounted display 16.

The simulated torch 17 is provided with a switch similar to the torch 6 of the first embodiment, and the control unit 50 recognizes as a simulated energization state when the switch is on. In a case where the tip end of the simulated torch 17 is positioned within a predetermined distance from the welding object simulated component 15 in the simulated energization state, the head-mounted display 16 further displays an arc light image simulating arc light and a molten pool image simulating a molten pool.

When the welder 4 moves the simulated torch 17, the positions of the arc light image and the molten pool image on the head-mounted display 16 accordingly move. In the configuration (see FIG. 1) of the first embodiment, data such as the arc light, molten pool, welding sound, welding current/voltage according to the operation of the torch 6 is accumulated in advance, and the result may be applied to the embodiment. That is, on the basis of the data accumulated in the past and the three-dimensional coordinate data on the welding object simulated component 15 and the simulated torch 17, the control unit 50 can reproduce the arc light image, the molten pool image, the simulated sound of the welding sound, the virtual welding current/voltage, and the like according to the operation of the simulated torch 17 on the head-mounted display 16.

Figure 9:
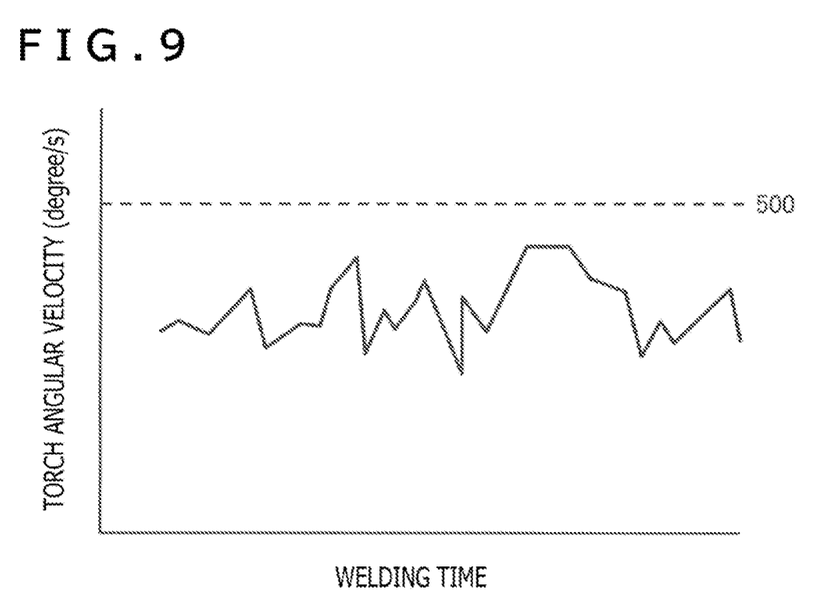
FIG. 9 depicts an example of a measurement result of the torch angular velocity in the third embodiment.

FIG. 9 depicts an example of the measurement result of the torch angular velocity in the present embodiment. It should be noted that in the measurement depicted in the drawing, the average moving velocity of the simulated torch 17 is 22.3 cm/min, which is in a good range according to the table 72 (see FIG. 6). On the other hand, the torch angular velocity of the simulated torch 17 is less than 500 degree/s during the entire period depicted in the drawing. As described above, according to the tables 72 and 74 (see FIG. 6), the example depicted in FIG. 9 satisfies the preferred range, that is, the operating range of a skilled worker in both the average moving velocity and the torch angular velocity, and it is conceivable that good welding can be obtained even when applied to actual welding.

Effect of Third Embodiment

As described above, the welding work education system 103 of the embodiment includes the welding object simulated component 15 that simulates the welding object 7, the simulated torch 17 that simulates the torch 6 for welding the welding object 7, the sensor (14) that detects the operating state of the simulated torch 17, the imaging unit (18) that images the simulated torch 17 and outputs a moving image, the work data acquisition unit 53 that acquires the work data including three-dimensional coordinate data on the welding object simulated component 15 and three-dimensional coordinate data on the simulated torch 17 on the basis of the moving image and the operating state, and the display unit (16) that displays a welding state image representing a welding state on the basis of the moving image and the past work data that is the work data stored in advance.

Accordingly, it is possible to safely train the torch operation without consuming the welding object 7 (see FIG. 1). Further, according to the present embodiment, since arc light does not occur, it is possible to accumulate accurate work data such as the three-dimensional coordinate data on the welding object simulated component 15 and the simulated torch 17, data on the torch height, welding time, welding position, and the like, and data on the angle of the right elbow, welding time, welding position, and the like. Accordingly, the training history, skill level, and the like of the welder 4 can be accurately managed.

Further, according to the present embodiment, the work data includes any of the average moving velocity of the simulated torch 17, the torch height (HT) that is a distance between the simulated torch 17 and the welding object simulated component 15, the weaving cycle of the simulated torch 17, the weaving width of the simulated torch 17, the angle of the simulated torch 17, the supply amount of the filler metal, the angle of the elbow on the side where the worker (4) gripping the simulated torch 17 grips the simulated torch 17, or the position of the head of the worker (4). Accordingly, it is possible to accumulate the detailed operations of the simulated torch 17 and the like. Further, the welding state image is a moving image including an arc light image simulating arc light and a molten pool image simulating a molten pool. Accordingly, a moving image with high presence can be displayed.

Modified Example

The present invention is not limited to the above-described embodiments, and various modifications are possible. The above-described embodiments have been exemplified to easily understand and describe the present invention, and the present invention is not necessarily limited to those including all the configurations described above. In addition, some configurations of an embodiment can be replaced by a configuration of another embodiment, and a configuration of an embodiment can be added to a configuration of another embodiment. In addition, some configurations of each embodiment can be deleted, or added to or replaced by other configurations. In addition, the control lines and the information lines considered to be necessary in the explanation are depicted in the drawings, but all the control lines and the information lines necessary in a product are not necessarily depicted. In practice, almost all the configurations may be considered to be connected to each other. For example, the followings are possible modifications to the above-described embodiments.

(1) In the first and second embodiments described above, the consumable electrode type semi-automatic arc welding is performed. However, other welding types, for example, TIG welding or the like may be applied to the first and second embodiments. Since a filler metal separated from the torch is used in the TIG welding, the marker 3 (see FIG. 1) may be attached to the filler metal in this case. Accordingly, it is possible also to obtain information such as the supply amount of the filler metal and the angle of the filler metal. In addition, although the consumable electrode type semi-automatic arc welding is simulated in the third embodiment, other welding types, for example, TIG welding or the like may be simulated.

(2) In addition, in the first embodiment, the wavelength of the irradiation light of the light irradiation units 60 of the cameras for marker measurement 2 is set to 850 nm, but light sources having a wide wavelength range may be used as the light irradiation units 60. In this case, it is preferable that the cameras for marker measurement 2 are provided with filters for extracting light having a specific wavelength from reflected light to measure light having a specific wavelength from light reflected from the marker 3 attached to the torch 6 or the like.

(3) In addition, as the marker 3 in the first embodiment, a marker that emits light by itself may be applied instead of a marker that reflects light. In this case, it is not necessary to provide the light irradiation units 60 in the cameras for marker measurement 2. In a case where a marker that emits light by itself is applied as the marker 3, any of a marker that emits light having a specific wavelength (for example, 850 nm) or a marker that emits light having a wide wavelength range may be applied. In a case where the latter marker having a wide wavelength range is applied, it is preferable that the cameras for marker measurement 2 are provided with filters for extracting light having a specific wavelength to measure light having a specific wavelength from light emitted from the marker 3. In addition, a filter function for reflecting light having a specific wavelength may be given to the marker 3.

(4) In the above-described second embodiment, the work data acquisition unit 43 acquires the work data on the basis of an output signal of the inertial sensor 14. However, a terrestrial magnetism measurement device, a global positioning system, an indoor global positioning system, a stereo camera, or the like is added to the second embodiment, and the work data may be acquired on the basis of the measurement results thereof and an output signal of the inertial sensor 14. In addition, the sensor for acquiring the work data may be a sensor other than the inertial sensor 14.

(5) In addition, an example in which the average moving velocity of the torch 6 and the torch angular velocity are applied as the feature amounts has been described in the second embodiment. However, the feature amounts to be extracted are not limited to these, but may be the torch height HT (see FIG. 2), the weaving conditions (the weaving cycle, weaving width, and the like), the torch angle, the supply amount of the filler metal (see FIG. 4), the angle of the right elbow (the angle of an elbow holding the torch, see FIG. 4), the position of the head of the welder 4, and the like.

(6) In addition, the camera 18 in the third embodiment may be a stereo-type camera. By applying the stereo-type camera, the positional relation between the welding object simulated component 15 and the simulated torch 17 can be more accurately measured, and three-dimensional precise distance information and positional information can be acquired. In addition, in the third embodiment, the patterns for image recognition are provided on the welding object simulated component 15 and the simulated torch 17. However, if the stereo-type camera is applied as the camera 18, the positional relation between the welding object simulated component 15 and the simulated torch 17 can be measured while omitting these patterns.

(7) Although the above-described welding work education system 103 of the third embodiment provides three-dimensional virtual reality, the actual welding object 7 and torch 6 (see FIG. 1) applied to the first and second embodiments may be applied to carry out education and training while performing actual welding work.

REFERENCE SIGNS LIST 2, 2a, 2b, 2c, 2d, 2e: Camera for marker measurement (photodetection unit)
3: Marker
4: Welder (worker)
6: Torch
7: Welding object
8: Semi-automatic welding power supply
9: Current/voltage/filler metal supply amount measurement device
14: Inertia sensor (sensor)
15: Welding object simulated component
16: Head-mounted display (display unit)
17: Simulated torch
18: Camera (imaging unit)
20, 40, 50: Control unit
22: Marker position acquisition unit
23: Welding operation data acquisition unit (torch position acquisition unit)
24: Recording unit
25: Determination unit
30: Filler metal
52: Database unit
53: Work data acquisition unit
54: Quality determination unit
60: Light irradiation unit
101: Welding work measurement system
102: Quality control system
103: Welding work education system (welding work measurement system)

The invention claimed is:

1. A welding work measurement system comprising:
a photodetection unit that detects light generated by a plurality of markers attached to a torch for welding a welding object or light reflected by the plurality of markers;
a marker position acquisition unit that acquires marker position data that is three dimensional coordinate data on the markers on a basis of the light detected by the photodetection unit;
a torch position acquisition unit that acquires torch position data that is three-dimensional coordinate data on the torch on a basis of the marker position data;
a sensor that detects an operating state of the simulated torch;
an imaging unit that images the simulated torch and outputs a moving image;
a work data acquisition unit that acquires work data including three-dimensional coordinate data on the welding object simulated component and three-dimensional coordinate data on the simulated torch on a basis of the moving image and the operating state; and
a display unit that displays a welding state image representing a welding state on a basis of the moving image and past work data that is the work data stored in advance.

2. The welding work measurement system according to claim 1, further comprising:
a light irradiation unit that irradiates the markers with light having a specific wavelength,
wherein the photodetection unit includes a filter for extracting the light having the specific wavelength, and
the marker position acquisition unit acquires the marker position data according to the light having the specific wavelength.

3. The welding work measurement system according to claim 2,
wherein the light having the specific wavelength includes light having a wavelength of 550 nm or more.

4. The welding work measurement system according to claim 1, further comprising:
a light irradiation unit that irradiates the markers with light having a specific wavelength.

5. The welding work measurement system according to claim 1,
wherein three or more markers are attached to the torch, and
the torch position acquisition unit acquires the torch position data on a basis of three or more pieces of the marker position data.

6. The welding work measurement system according to claim 1,
wherein the plurality of markers has spherical portions.

7. The welding work measurement system according to claim 1,
wherein the plurality of markers is arranged so as not to overlap each other when viewed from the photodetection unit when the torch is used.

8. The welding work measurement system according to claim 1,
wherein the photodetection unit is a camera for photographing a moving image, and the marker position acquisition unit distinguishes an image of the marker from other images on a basis of a size of an image included in the moving image or sphericity.

9. The welding work measurement system according to claim 1,
wherein any of the plurality of markers is also attached to a filler metal applied to welding work or to a worker who grips the torch, and
the torch position acquisition unit acquires three-dimensional coordinate data on the filler metal or the worker in addition to the three-dimensional coordinate data on the torch.

10. The welding work measurement system according to claim 1, further comprising:
a recording unit that records work data in which the three-dimensional coordinate data on the torch and welding evaluation data that is an evaluation result for a welding state of the welding object after completion of the welding are associated with each other.

11. The welding work measurement system according to claim 10,
wherein the recording unit stores the work data in association with a welding time or a welding position, and
a determination unit that determines a quality of new welding work on a basis of the work data stored in the recording unit in the past and the three-dimensional coordinate data on the torch acquired in the new welding work is further provided.

12. The welding work measurement system according to claim 11,
wherein the work data includes any of an average moving velocity of the torch, a torch height of the torch, a weaving cycle of the torch, a weaving width of the torch, an angle of the torch, a supply amount of a filler metal, an angle of an elbow on a side where a worker gripping the torch grips the torch, or a position of a head of the worker.

13. A welding work measurement system comprising:
a welding object simulated component that simulates a welding object;
a simulated torch that simulates a torch for welding the welding object;
a sensor that detects an operating state of the simulated torch;
an imaging unit that images the simulated torch and outputs a moving image;
a work data acquisition unit that acquires work data including three-dimensional coordinate data on the welding object simulated component and three-dimensional coordinate data on the simulated torch on a basis of the moving image and the operating state; and
a display unit that displays a welding state image representing a welding state on a basis of the moving image and past work data that is the work data stored in advance.

14. The welding work measurement system according to claim 13,
wherein the work data is data including any of an average moving velocity of the simulated torch, a torch height that is a distance between the simulated torch and the welding object simulated component, a weaving cycle of the simulated torch, a weaving width of the simulated torch, an angle of the simulated torch, a supply amount of a filler metal, an angle of an elbow on a side where a worker gripping the simulated torch grips the simulated torch, or a position of a head of the worker.

15. The welding work measurement system according to claim 14,
wherein the welding state image is a moving image including an arc light image simulating arc light and a molten pool image simulating a molten pool.

* * * * *